United States Patent [19]

Brandli

[11] 3,916,690
[45] Nov. 4, 1975

[54] APPARATUS FOR MEASURING SURFACE TEMPERATURES BY INFRARED RADIATION THEREFROM

[75] Inventor: Gerold Brandli, Windisch, Switzerland

[73] Assignee: BBC Brown Boveri & Company Limited, Baden, Switzerland

[22] Filed: July 19, 1973

[21] Appl. No.: 380,572

[30] Foreign Application Priority Data
July 27, 1972 Switzerland...................... 11176/72

[52] U.S. Cl. .............. 73/355 EM; 250/341; 356/47
[51] Int. Cl.² ...... G01J 5/08; G01J 5/52; G01J 5/62
[58] Field of Search...... 73/355 R, 355 EM; 356/46, 356/47, 48; 250/341, 347, 351

[56] References Cited
UNITED STATES PATENTS

| | | | |
|---|---|---|---|
| 2,611,541 | 9/1952 | Gray ............................. | 73/355 EM |
| 2,837,917 | 6/1958 | Machler........................ | 73/355 EM |
| 2,978,589 | 4/1961 | Howell ....................... | 73/355 R UX |
| 3,091,693 | 5/1963 | Rudomanski ................. | 73/355 R X |
| 3,264,931 | 8/1966 | Ackerman et al. ........... | 73/355 R X |
| 3,392,282 | 7/1968 | Astheimer.......................... | 250/351 |
| 3,492,869 | 2/1970 | Toyota et al................... | 73/355 EM |
| 3,796,099 | 3/1974 | Shimotsuma et al. ......... | 73/355 EM |

Primary Examiner—Richard C. Queisser
Assistant Examiner—Frederick Shoon
Attorney, Agent, or Firm—Pierce, Scheffler & Parker

[57] ABSTRACT

Apparatus for measuring the temperature at the surface of an object by measurement of the infrared radiation emitted from the surface comprises a variably heated compensating radiator located in spaced relation to the surface of the object and a rotatable chopper wheel interposed between the object surface and the compensating radiator. The side of the chopper wheel facing towards the compensating radiator is made radiation reflective and a radiation detector is positioned to receive in alternation the infrared radiation emitted from the surface of the object and which passes intermittently through the rotating chopper wheel and infrared radiation emitted by the compensating radiator and which is reflected intermittently into the detector from the reflective side of the chopper wheel. The detector produces at its output an alternating current signal determined by any temperature differential existing between the object and compensating radiator, and the heat supply to the compensating radiator is varied in accordance with the signal in such sense as to reduce the signal to zero whereby the temperature of the compensating radiator then equals the temperature of the object.

6 Claims, 3 Drawing Figures

APPARATUS FOR MEASURING SURFACE TEMPERATURES BY INFRARED RADIATION THEREFROM

The present invention relates to an improved arrangement to measure and/or control the temperature of surfaces without physical contact and without limitation to the type of material, by means of infrared pyrometric measurement, whereby a radiative equilibrium is established between the object to be measured and a heated, compensating radiator.

Usually, a temperature measurement at surfaces without physical contact will be of lesser precision that the direct contact method but will always be required in certain instances, for example in the case of a moving object or where the surface of an object must not be damaged. With the exception of the possibility to attach dyestuff, dielectric media and other foreign substances to the object and to observe their temperature-related characteristics from a distance, there remains practically only one method of such measurement, namely the radiant pyrometric method. Thermal radiation which is emitted by all bodies represents in principle a strong signal which is very informative which however cannot be utilized fully by the majority of the radiation pyrometers because the emission factor of the object to be measured and the surrounding radiation, reflected by it, influence the values obtained by such measurements in a manner insufficiently known. In order to insure precise temperature measurements by use of thermal radiation it is therefore important to keep away the surrounding radiation and to eliminate the emission factor by compensating radiation.

Several radiation pyrometers are known which utilize the above discussed principle. One of these devices compensates the radiation emitted by the object to be measured into black-body radiation by reflected radiation produced by a well-defined radiator. However, systems of this type are limited to objects with practically specular reflecting surfaces. In the case of another known pyrometer, a highly reflecting and integrating hemisphere is placed upon the object to be measured. However, difficulties will arise when smooth metal surfaces are being measured because the hemisphere does not reflect fully.

Finally, in the case of a third known apparatus, a blackened body is heated until the temperature gradient within the surface opposite the object to be measured disappears. The temperature is then determined by a thermometer in contact with the body. This arrangement has the disadvantage that it will act slowly time-wise, and that it will also respond to vertical air movements which often will interfere adversely.

The principal objective of the invention is/to avoid and eliminate the disadvantages of the known measuring systems operating in accordance with the above discussed principle. The invention accomplishes this objective in the case of the above-discussed method to measure the temperature by means of infrared pyrometry with a heated, compensating radiator in that there is arranged between radiator and object to be measured a revolving bladed chopper wheel, with a reflecting coating on one side. During the rotation of the chopper wheel and at the time intervals when the radiation from the object to be measured is allowed to pass through the gaps between the blades of the chopper wheel, this radiation is measured during its further path of travel by means of an infrared detector, while during the periods of time when said radiation is masked by a blade of the chopper wheel, these periods of time alternating with the first mentioned time intervals, the radiation emitted by the compensating radiator is reflected by that surface of said blade which is facing away from the object to be measured and which is provided with the reflecting coating, and reach the infrared detector in place of the masked radiation from the object to be measured, with the result that in a case of radiative non-equilibrium - that is a difference in temperature between object to be measured and radiator - an a.c. signal will be generated at the output of the infrared detector, its frequency being controlled by the speed of the chopper wheel; this signal is conducted, after phase-responsive rectification, to a regulating device which will control the heat supply to the compensating radiator for the purpose of attaining a radiative equilibrium between object to be measured and compensating radiator in such manner that the signal at the detector output becomes zero, thus indicating that the temperature, measured at the compensating radiator, corresponds to the temperature of the object to be measured.

A preferred embodiment of the invention is explained below in detail and in conjunction with the accompanying drawing wherein.

Figure 1:
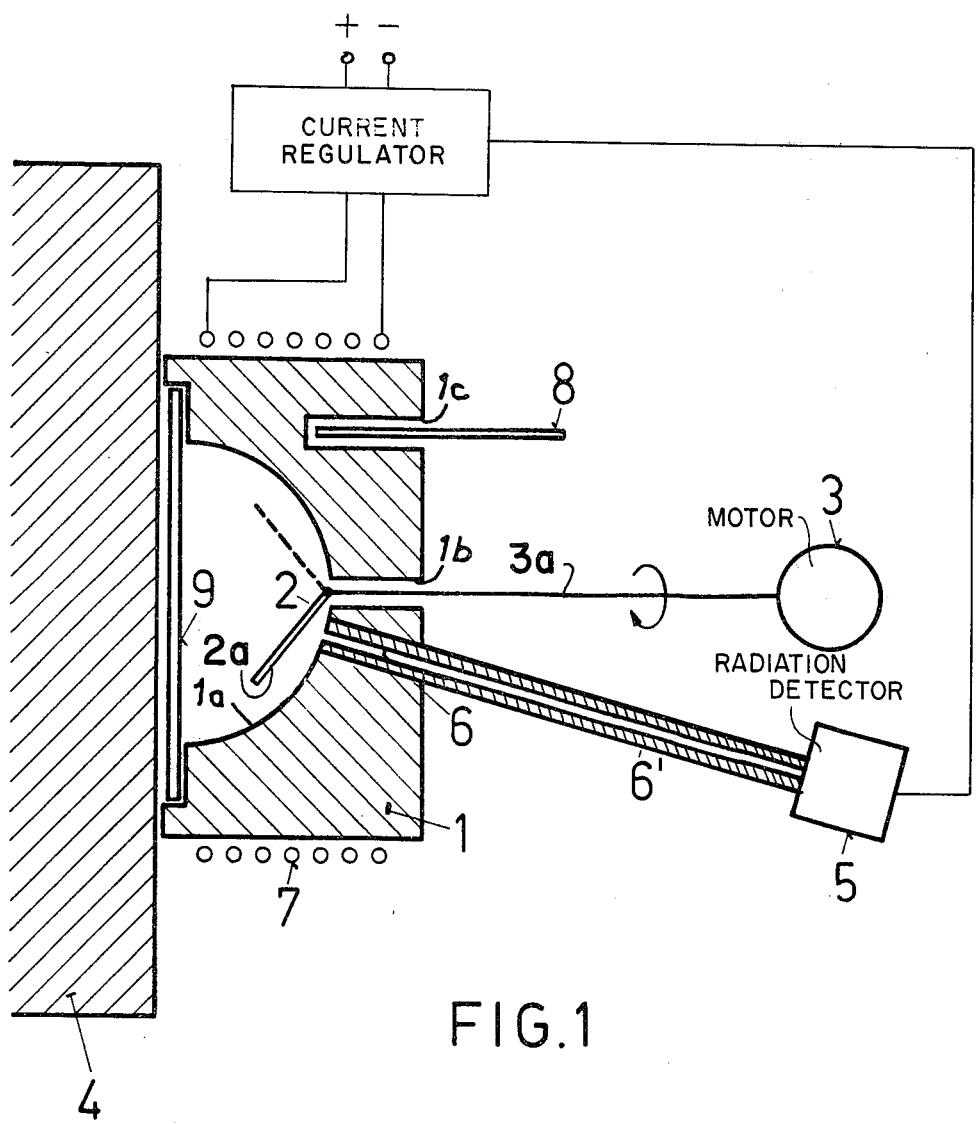
FIG. 1 depicts diagrammatically the improved measuring apparatus based on the method proposed by the invention.

With reference now to FIG. 1, the surface whose temperature is desired to be measured is denoted by numeral 4. The compensating radiator in the form of a cylindrical metal body, such as copper, possessing good thermal conduction is denoted by numeral 1. This metal body is provided with a hemispherical cavity 1a at one of its end faces which is placed upon, or in the immediate vicinity of, the object 4 to be measured. Numeral 2 denotes the radiation chopper wheel arranged inside the hollow space of the hemispherical recess and depicted in this figure in the form of a diagrammatic side view; it can have approximately the shape as shown in plan by FIG. 2. The surfaces of its three blades facing away from the object to be measured are provided with a reflecting coating 2a. The axis of rotation of the chopper wheel 2 extends outwardly through a bore 1b arranged within, and at the center axis of, the metallic body 1, and is driven by a motor 3. Within the metallic body 1 there is further provided a second bore 6 which extends in a radial direction relative to the hemispherical hollow area, and at an acute angle relative to the bore 1b for the rotary axle driving the chopper wheel 2, and at such distance from the latter that the blades of the chopper wheel 2 can mask the direct radiation incident from the object 4 to be measured into the second bore 6.

An infrared detector is denoted at 5 which, in the case of the illustrated embodiment, is connected with the hollow space 1a of the metallic body 1 by way of the second bore 6 and an infrared conductor 6' continuing outwardly and in the direction of said bore. It is also feasible to arrange the infrared detector 5 inside the metallic body 1 and to connect it with the hollow space 1a solely by means of bore 6.

A heating coil 7 surrounds the mettalic body 1, its power supply controlled by an electronic control circuit, known per se and therefore not illustrated here, which receives the output signal of the infrared detector in the form of a controlling pulse. Numeral 8 denotes a contact thermometer which can be inserted into a blind hole 1c provided in the metallic body 1.

In order to protect the chopper wheel 2 and the surface of the hemispherical recess within the metallic body 1, the base of this recess can be covered and thereby protected by a window 9 but which however, permits the passage of infrared radiation from the body 4.

It is also possible to blacken the concave hemispherical surface of the metallic body 1 to insure that the radiation conditions inside the hollow space are in close agreement with Planck's principle. This step will not be necessary if the metallic body 1 is arranged in very close proximity to the object 4 to be measured, or if it is placed directly upon it, and if the diameter of the bore 6 through which the infrared radiation reaches the outside from the hollow space, is relatively small.

Figure 2:
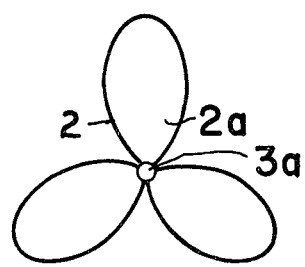
FIG. 2 is a plan view of the chopper wheel 2, shown by FIG. 1.

During normal operations, that is for temperature measurements, the chopper wheel 2 rotates at a constant speed, whereby at the time intervals, during which the direct radiation emitted by the object 4 can pass through the blade spacings, see FIG. 2, this radiation will reach the infrared detector 5 by way of bore 6, i.e. the infrared conductor 6' and generate an output signal with a certain amplitude. During the time periods alternating with these intervals, when the direct radiation is masked by the blades of the chopper wheel 2, the surfaces of the blades which are provided with a reflecting coating on the side facing away from the object 4 will cause the radiation, emitted by the concave hemispheric surface of the radiator 1 and reflected by said blade coatings, to enter the bore 6 and to arrive at the infrared detector 5 in place of the direct radiation. If there is no radiation equilibrium, that is if the temperatures of object 4 to be measured and radiator 1 differ, the amplitudes of the detector output signal obviously will vary, depending on the radiation being received; either direct radiation from 4 or reflected radiation from 1. With the exception of the d.c. component, which is filtered out, there will appear across the detector output an a.c. signal, its phase differing by 180°, depending on the temperature of the radiator 1 which might be either higher or lower than the temperature of the object 4 to be measured. This signal is rectified in relation to phase and is fed as a controlling pulse into the above discussed, not illustrated electronic device which regulates the current flowing through the heating coil 7 in accordance with the polarity of the controlling pulse (that is according to the phase of the detector output signal and thus the sign of the temperature difference between object and radiator as explained above) in such manner that the temperature of the radiator 1 is either increased or reduced, if it is lower, or higher respectively, than the temperature of the object 4, until the a.c. voltage signal across the detector output, and with it the controlling pulse, disappears. At this moment the radiation equilibrium, and thus the temperature uniformity between radiator 1 and object 4 to be measured is attained, and the radiator temperature - which is now also the temperature of the object to be measured - can be read from the contact thermometer 8.

Figure 3:
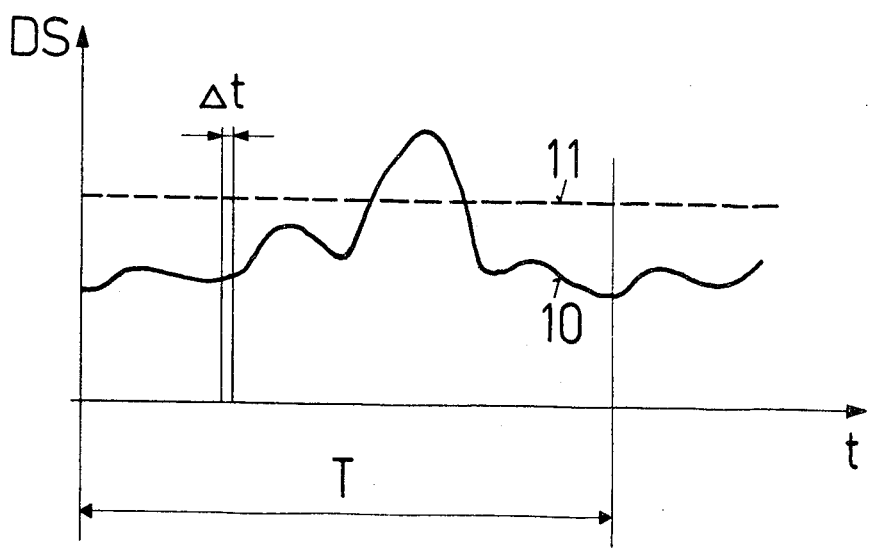
FIG. 3 shows a time graph of the detector signal with stabilized temperature distribution at the surfaace of a rotating object to be measured.

If the system is to be used for the control of processing, the temperature of the radiator 1 is brought to the desired temperature to be read from the thermometer 8 by appropriate control of the current through coil 7, and the output signal of the detector 5, after proper phase rectification, see above, is then used directly for processing control. Since in this case the thermal lag of the radiator is eliminated from the process, a very rapid response time will be attained. When measuring stabilized temperature distributions at the surface of a relatively rapidly rotating object, it will be advantageous to employ a quickly responding infrared detector. Its output signal, synchronized with the rotations of the object to be measured by trigger pulses, will then have a characteristic as shown for example by the time graph of FIG. 3, graph plot 10. In this figure, the time axis is indicated by t, and the detector signal DS is plotted on the Y-axis. T represents the time which is required for one revolution of the object to be measured. The reflectively coated chopper wheel 2 rotates, in this case of temperature measurement, at a much lower speed than the object, with the result that the detector signal for several revolutions by the object 4 corresponds to graph plot 10, direct radiation from the object or to horizontal line 11, its level being determined by the temperature of the radiator 1. By electronic means known per se, the detector signal is picked up in stroboscope fashion within the time interval $\Delta t$, rectified in relation to phase, in comparison with the signal reflected by the chopper wheel and utilized to regulate the heating coil 7 as described above. In this manner it is possible to determine first the temperature at the point which corresponds to the time-wise position of the interval $\Delta t$. By shifting the interval $\Delta t$ it becomes possible to scan and determine eventually the entire temperature distribution.

The method proposed by the invention improves substantially the measurement of temperatures when compared with known pyrometric systems, and especially for objects with low emission factor temperatures ranging from room temperature to approximately 700°C.

I claim:

1. Apparatus for measuring the temperature at the surface of an object by measurement of the infrared radiation emitted from the surface which comprises a compensating radiator in the form of a thermally conductive metallic body having a radiation cavity in one side thereof facing towards the surface of the object to be measured, means for heating said metallic body, a rotatable chopper wheel located within said radiation cavity and which is interposed between the surface of the object and the surface forming the radiation cavity in said metallic body, the side of said chopper wheel facing towards said cavity forming surface being radiation reflective and said chopper wheel being carried by a shaft extending outwardly through a bore in said metallic body and which is connected to a driving motor, an infrared radiation detector positioned outside of said metallic body and which receives in alternation by way of a second bore leading outwardly through said metallic body from said radiation cavity the infrared radiation emitted from the surface of the object and which passes intermittently through said rotating chopper wheel and infrared radiation emitted by the cavity forming surface of said metallic body and which is reflected intermittently into said detector from the reflective side of said chopper wheel, said detector producing at its output an alternating current signal determined by any temperature differential existing between the object and said metallic body, and means for controlling the supply of heat to said metallic body in accordance with said alternating current signal in such sense as to reduce said signal to zero whereby the temperature of said metallic body then equals the temperature of the object.

2. Apparatus as defined in claim 1 for measuring the temperature at the surface of an object wherein said second bore contains a conductor of infrared radiation leading to said detector.

3. Apparatus as defined in claim 1 for measuring the temperature at the surface of an object wherein said compensating radiator includes a third bore therein for receiving a temperature measuring element such as a thermometer.

4. Apparatus as defined in claim 1 for measuring the temperature at the surface of an object wherein the cavity forming surface of said metallic body is blackened.

5. Apparatus as defined in claim 1 for measuring the temperature at the surface of an object and wherein said means for heating said metallic body is constituted by an electric heating coil surrounding the metallic body and wherein the current passed through said coil is varied in dependence upon the output signal produced by said detector.

6. Apparatus as defined in claim 1 for measuring the temperature at the surface of an object and which further includes a window closing off said radiation cavity but which passes through it the radiation emitted from the surface of the object, said window providing protection for the surface of said radiation cavity and also said chopper wheel.

* * * * *